United States Patent [19]

Hayashi et al.

[11] Patent Number: 4,562,346
[45] Date of Patent: Dec. 31, 1985

[54] APPARATUS AND METHOD FOR DETECTING FOCUS CONDITION OF IMAGING OPTICAL SYSTEM EMPLOYING BOTH SHARPNESS DETECTION AND LATERAL SHIFT DETECTION

[75] Inventors: Asao Hayashi, Tokyo; Kenichi Oinoue; Masahiro Aoki, both of Tokyo; Masatoshi Ida, Tokyo, all of Japan

[73] Assignee: Olympus Optical Company Limited, Tokyo, Japan

[21] Appl. No.: 494,388

[22] Filed: May 13, 1983

[30] Foreign Application Priority Data

May 18, 1982 [JP] Japan ................................ 57-82365

[51] Int. Cl.[4] ................................ G01J 1/20
[52] U.S. Cl. ................................ 250/201; 250/204; 354/406
[58] Field of Search ............ 250/201, 204; 356/1, 356/4; 354/403, 404, 406–408

[56] References Cited

U.S. PATENT DOCUMENTS

| 4,185,191 | 1/1980 | Stauffer | 250/204 |
| 4,246,476 | 1/1981 | Stauffer | 250/201 |
| 4,249,073 | 2/1981 | Stauffer | 250/204 |
| 4,250,376 | 2/1981 | Joseph | 250/201 |
| 4,349,254 | 9/1982 | Jyojiki et al. | 250/201 |
| 4,387,975 | 6/1983 | Araki | 250/201 |

*Primary Examiner*—David C. Nelms
*Attorney, Agent, or Firm*—Parkhurst & Oliff

[57] ABSTRACT

In a camera, a focus condition of an objective lens system is automatically detected in accordance with a combination of two different type detection methods. A light flux emanating from the objective lens system is divided into two light fluxes by means of a prism having a half mirror and a reflecting mirror and a first light flux transmitted through the half mirror is received by a first light receiving element array via a lenticular lens array and a second light flux reflected by the half mirror and reflecting mirror successively is directly received by a second light receiving element array. The lenticular lens array is so arranged that an exit pupil of the objective lens and the first light receiving element array are conjugated with each other and thus divided images of the exit pupil are projected upon respective elements of each pair of adjacent light receiving elements. At first, illumination signals supplied from the first image receiving element array are processed to derive a first evaluation value on the basis of an image lateral shift detection to indicate roughly a focal condition of the objective lens system. After the objective lens system has driven near the best focus position, illumination signals supplied from the first and second light receiving element arrays are processed to derive a second evaluation value on the basis of an image sharpness detection to indicate finely the focal condition of the objective lens system.

16 Claims, 21 Drawing Figures

FIG.5
_PRIOR ART_

FIG.6
_PRIOR ART_

APPARATUS AND METHOD FOR DETECTING FOCUS CONDITION OF IMAGING OPTICAL SYSTEM EMPLOYING BOTH SHARPNESS DETECTION AND LATERAL SHIFT DETECTION

BACKGROUND OF THE INVENTION

The present invention generally relates to a technique for detecting automatically a focus condition of an optical system in camera, microscope, high density optical recording and reproducing apparatus, etc.

Heretofore, there has been developed a still camera comprising an automatic focus detecting device for forming a finely focused image on a predetermined focal plane, i.e. a film plane. For detecting the focus condition automatically, there have been proposed two methods, one method is referred to as an image sharpness detection method and the other method is termed as an image lateral shift detection method. Now the above two methods will be explained.

Figure 1:
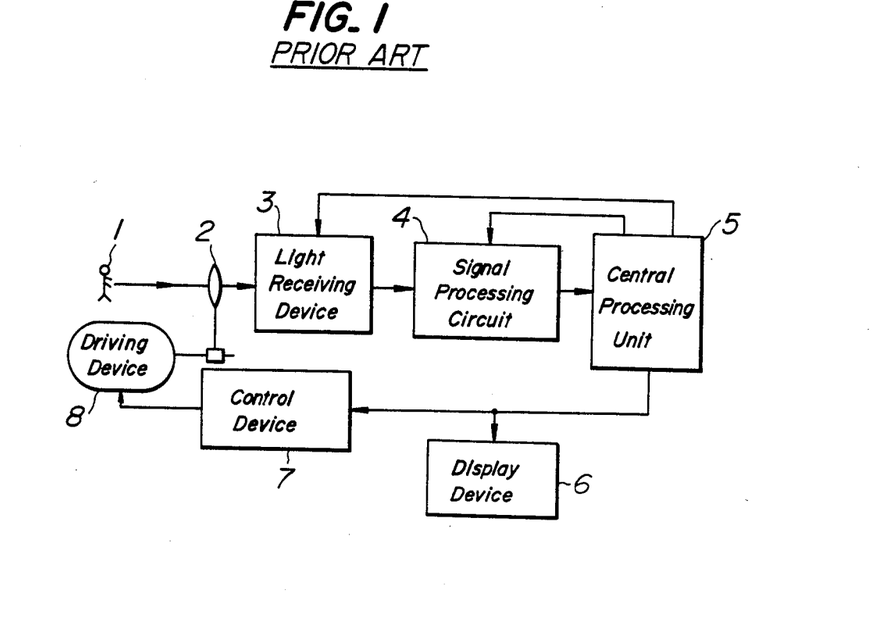
FIG. 1 is a block diagram showing a general construction of a camera comprising a known focus detection apparatus.

FIG. 1 is a schematic view showing a general construction of the known focus detection apparatus. In FIG. 1, an image of an object 1 is projected by an imaging optical system 2 onto a light receiving device 3 comprising a number of light receiving regions, i.e. picture cells. Illumination signals supplied from the light receiving device 3 are converted parallelly into digital information by a signal processing circuit 4. The digital information is fed to a central processing unit 5 and is processed therein to generate a focus detection signal representing a focus condition of the optical system 2 with respect to a predetermined focal plane, i.e. a film plane. The focus detection signal thus generated is supplied to a display device 6 to inform a user of the focus condition. The focus detection signal is further supplied via a control circuit 7 to a device 8 such as a motor for driving the optical system 2 to move the optical system in a direction of its optical axis. The control circuit 7 and the driving device 8 may be omitted. In such a case, the optical system 2 may be adjusted manually in accordance with an indication made by the display device 6.

Figure 2:
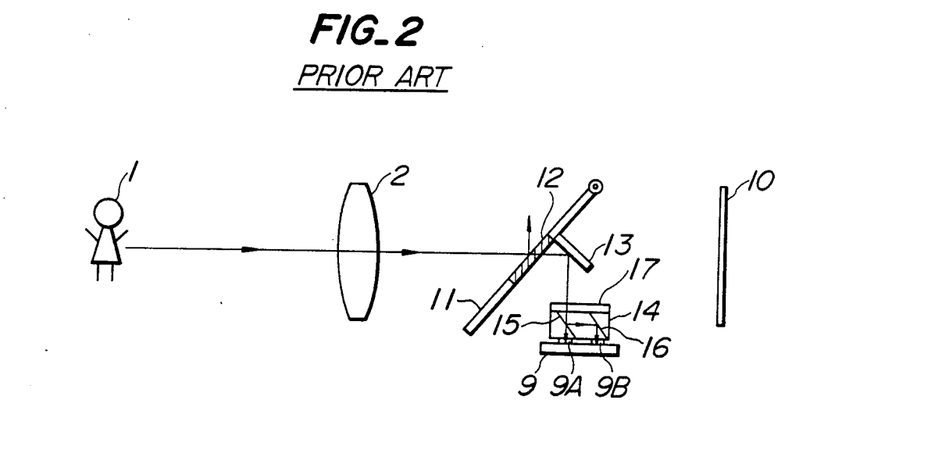
FIG. 2 is a schematic view depicting a known focus detection apparatus based on the image sharpness detection method.

FIG. 2 is a schematic view showing the known focus detection device employing the image-sharpness detection method. The light receiving device 3 comprises a substrate 9 and a pair of arrays 9A and 9B of light receiving elements. These light receiving element arrays 9A and 9B are arranged on respective sides of a predetermined focal plane which is conjugated with the film plane and are separated from the conjugated focal plane by equal distances. In case of applying the focus detection device to a single-lens reflex camera, there is provided a half mirror 12 in a center portion of a quick-return mirror 11 arranged between the imaging lens system 2 and a film 10. A light flux transmitted through the half mirror 12 is reflected by a mirror 13 provided on the rear surface of the quick-return mirror 11 toward a light flux dividing prism 14. The prism 14 comprises a half mirror 15 and a reflection mirror 16 and a half of the incident light flux transmitted through the half mirror 15 is made incident upon the first light receiving element array 9A and the other half of the incident light flux reflected by the half mirror 15 and mirror 16 is made incident upon the second light receiving element array 9B. On the upper surface of the prism 14 is arranged a filter 17 for cutting infrared light.

In the image-sharpness detection method, the central processing unit 5 produces the focal detection signal in accordance with an evaluation function F(x), wherein x is a position of the lens system 2 with respect to a reference position x=0 at which the lens system 2 is focused for an object situating at an infinitive range. Now it is assumed that the number of light receiving elements of each arrays 9A and 9B is equal to N, amounts of output signals from kth and (k+1)th light receiving elements ($1 \leq k \leq N-1$) in case that the lens system 2 is in a position x are fx(k) and fx(k+1), and a difference between the output signals is denoted by $Mx = |fx(k) - fx(k+1)|$. Then the evaluation function F(x) can be given by a sum of the maximum difference Mx·1, the second maximum diference Mx·2 ... and the (n−b 1)th maximum difference Mx·(n−1). Thus, the evaluation function F(x) can be given as follows.

$$F(x) = \sum_{i=1}^{n-1} Mx \cdot i \quad (n \leq N)$$

Figure 3:
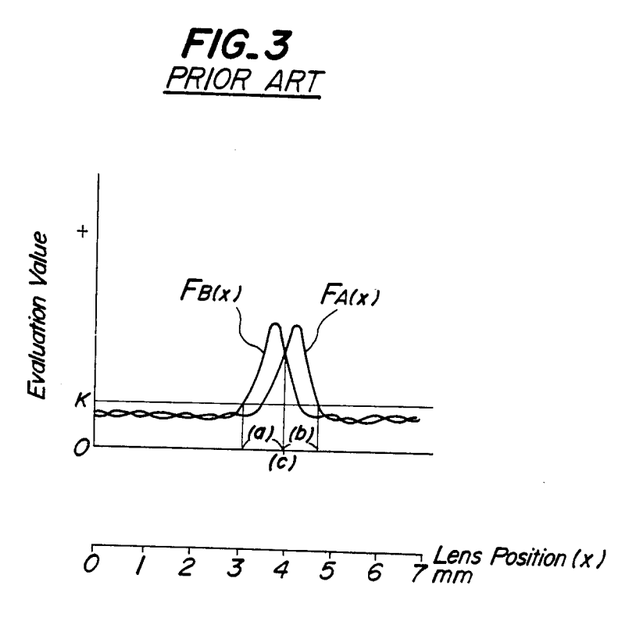
FIGS. 3 and 4 are graphs for explaining the operation of the focus detection apparatus shown in FIG. 2.
Figure 4:
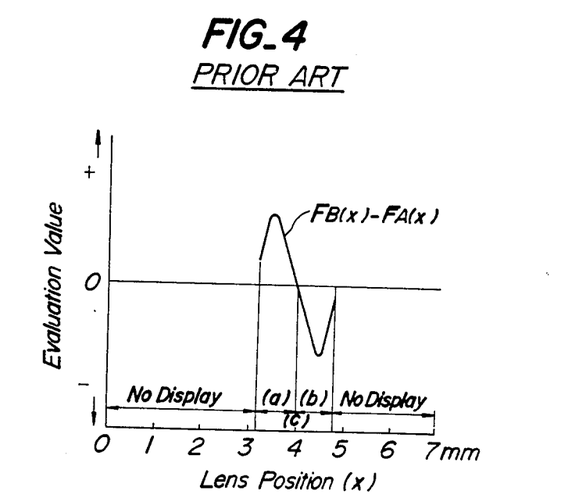

FIG. 3 shows curves representing a relation between the position of the lens system 2 and the evaluation functions $F_A(x)$ and $F_B(x)$ obtained by processing the output signals from the light receiving element arrays 9A and 9B, respectively. In this example, use is made of the lens system 2 having a focal length f=50 mm and an F number of 1.4. FIG. 4 illustrates a curve showing a difference $F_B(x) - F_A(x)$ between the evaluation functions $F_A(x)$ and $F_B(x)$ and this difference is used to determine the focal condition of the lens system 2. When both the evaluation values $F_A(x)$ and $F_B(x)$ are smaller than K in FIG. 3, the evaluation is no more effected, because in such a case the evaluation values do no longer contribute to the focus detection.

As shown in FIG. 4, the difference $F_B(x) - F_A(x)$ has a very steep slope and thus, the focus condition can be detected with an extremely high sensitivity. A possible error might be about ±30 μm. However, since the difference $F_B(x) - F_A(x)$ can be obtained within only a very small range in the lens position (x), the focal detection can only be possible within a narrow range near the in-focused position. That is to say, ranges (a) and (b) in which the lens system can be judged to be out of focus forwardly and backwardly, respectively are very narrow. As shown in FIG. 4, the ranges (a) and (b) have a length of about 1.6 mm, while the lens system 2 can be moved over a wide distance of 7 mm. When the lens system 2 is positioned in a range out of the ranges (a) and (b), it is impossible to determine the focus condition and therefore, the user cannot know a direction into which the lens system 2 should be driven or the automatic focus could not work properly.

Next, the focal detection method utilizing the lateral shift of the image will be explained.

Figure 5:
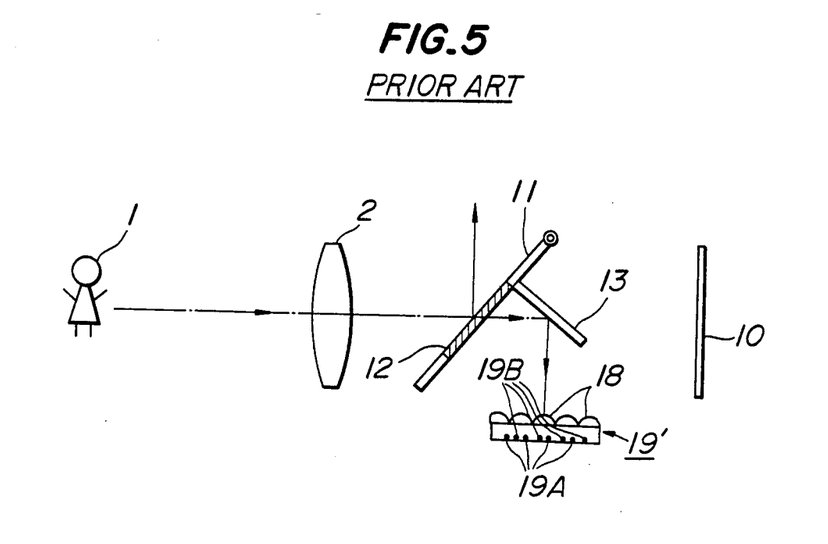
FIGS. 5 and 6 are schematic views illustrating a known focus detection apparatus based on the lateral shift detection method.
Figure 6:
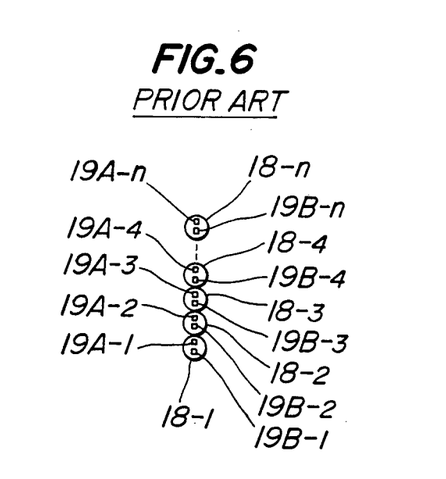

FIGS. 5 and 6 are schematic views showing the known focus detection device of the image shift detection method. In this device, the light receiving device 3 comprises an array of optical systems 18-1, 18-2 ... 18-n such as lenticular lenses and micro lenses, and an array of light receiving elements 19A-1, 19A-2 ... 19A-n, 19B-1, 19B-2 ... 19B-n. The optical systems 18 are arranged substantially in the predetermined focal plane conjugated with the plane of the film 10 in such a manner that the exit pupil of the imaging optical system 2 are conjugated with the light receiving elements 19A and 19B with respect to the auxiliary optical systems 18. Thus, each of the auxiliary optical systems 18 serves to divide the image of the exit pupil of the imaging lens system 2 and the divided images are selectively made incident upon a pair of light receiving elements 19A-i and 19B-i. That is to say, in front of each pair of light receiving elements 19A-1, 19B-1; 19A-2, 19B-2; ... 19A-n, 19B-n there are provided respective auxiliary optical systems 18-1, 18-2 ... 18-n such as lenticular lenses in such a manner that the pair of light receiving elements are conjugated with respective portions of the exit pupil plane which are divided by a plane perpendicular to the direction of the light receiving element array and containing the optical axis of the imaging lens system 2.

In the focus detection system shown in FIGS. 5 and 6, when at least a part of the image of the object 1 is projected upon the all pairs of light receiving elements 19A-1, 19B-1; 19A-2, 19B-2; ... 19A-n, 19B-n by means of the imaging lens system 2 and auxiliary optical systems 18-1, 18-2 ... 18-n, a light flux transmitted through a lower half portion of the imaging lens system 2 is selectively made incident upon the first group of the light receiving elements 19A-1, 19A-2 ... 19A-n, while a light flux transmitted through an upper half portion of the imaging lens system 2 is selectively made incident upon the second group of the light receiving elements 19B-1, 19B-2 ... 19B-n. By suitably processing output signals from the light receiving elements, it is possible to detect the focus condition of the imaging lens system 2.

Figure 7:
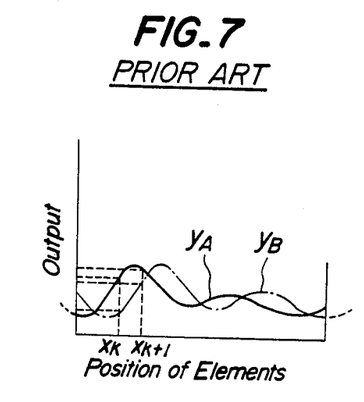
FIGS. 7 and 8 are graphs for explaining the operation of the focus detection apparatus shown in FIG. 5.

FIG. 7 shows curves $y^a$ and $y^b$ representing the outputs of the first and second light receiving elements 19A and 19B, respectively. It should be noted that in the in-focused condition, these two output curves $y^a$ and $y^b$ become identical with each other, but in the de-focused condition they are shifted from each other. Now, it is assumed that outputs from the kth light receiving elements 19A-k and 19B-k in case that the imaging lens system 2 is at a position x are denoted by $y_k^a$ and $y_k^b$, respectively. Then, the focus condition of the imaging lens system 2 can be determined by deriving the following evaluation function J(x) by means of the signal processing circuit 4 and central processing unit 5.

$$J(x) = \sum_{k=1}^{n-1} (y_k^a - y_{k+1}^a)(y_k^a - y_k^a)$$

Figure 8:
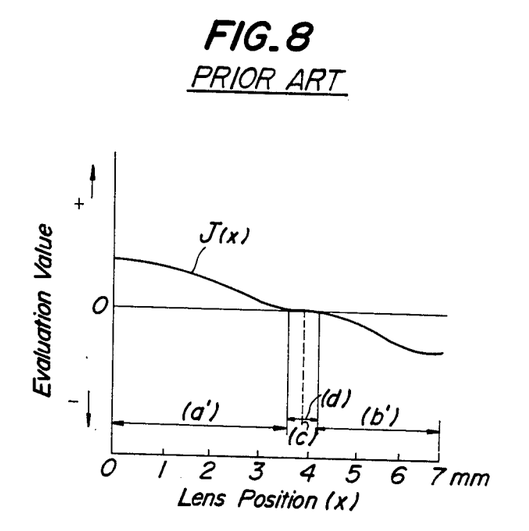

A typical evaluation value J(x) is shown in FIG. 8. Although the evaluation value J(x) fluctuates to a small extent due to variation of light receiving elements and quantizing error in the A/D conversion in the signal processing circuit 4, it is possible to determine the focus condition of the imaging lens system 2 over the whole range of the lens position x. That is to say, it is possible to obtain backwardly- and forwardly-defocused regions (a') and (b') having very wide ranges. Of course, the in-focused region (d) including the best focus position (c) can also be obtained. However, in the in-focused region (d), the evaluation value J(x) has a very small inclination and thus the accuracy of the focus detection near the best focus point (c) is low. Usually, there is a relatively large error of ±0.1 to ±0.2 mm. Therefore, even if one takes a photograph while the in-focused condition is indicated, it is not always possible to obtain a sharply focused image.

In the known lateral image shift detection method, the in-focus region (d) may be narrow when the light intensity of the light receiving elements is increased by making the dimension of the elements large as compared with the maximum dimension of the image of exit pupil of the imaging lens system 2 formed by the auxiliary optical system 18. However, in this case, if the position of the light receiving elements is deviated with respect to the auxiliary optical system, the in-focus region (d) of the evaluation value J(x) might be shifted toward the region (a') or (b') and an erroneous judgement might be effected. In order to avoid such a drawback, in the known focus detection system, the light receiving elements are so constructed that each pair of elements 19A-1, 19B-1; 19A-2, 19B-2; ... 19A-n, 19B-n are situated within respective images of the exit pupil of the imaging lens system 2 formed by respective auxiliary optical systems 18-1, 18-2 ... 18-n.

The dimension of the image of the exit pupil of the imaging lens system 2 varies in accordance with the F number of the system 2 and becomes smaller with increasing F number. Therefore, when the dimension of the light receiving elements is determined for the imaging lens system 2 having a small F number, then if the imaging lens system 2 is replaced by another imaging lens system having a larger F number, the above mentioned drawback might appear.

In order to obviate such a drawback, in U.S. patent application Ser. No. 29,498 filed on Apr. 12, 1979, (now U.S. Pat. No. 4,246,476) there has been proposed a focus detection device in which first and second pairs of light receiving elements are provided, the first pair of elements having a dimension substantially equal to the image of the exit pupil of an imaging lens system having the F number of 2.8 and the second pair of elements having such a dimension equal to an image of exit pupil of an imaging lens system of the F number of 4.0. When use is made of an imaging lens system having the F number smaller than 2.8, the first pair of elements is used and when the imaging lens system having the F number smaller than 4.0, but larger than 2.8 is used, the second pair of elements is selected. In such a focus detection device, the selected light receiving element pair has always a dimension smaller than the exit pupil image of the imaging lens system to be used and therefore, the erroneous determination can be effectively prevented. Particularly, in case of using the imaging lens system having the F number equal to 2.8 or 4.0, the image of the exit pupil becomes identical with the dimension of the light receiving element pair, so that the focus condition can be detected with a high sensitivity. However, when use is made of the imaging lens system of F number of 1.4 or 3.5, the dimension of the element pair becomes substantially smaller than the exit pupil image and therefore, the sensitivity is decreased to a great extent.

Now the decrease of the sensitivity will be further explained. The dimension y' of the exit pupil of the imaging lens system 2 formed by the auxiliary optical system 18 can be expressed as follows, $$y' = \frac{fs}{(a - fs)} \cdot y$$

wherein y is a dimension of the exit pupil of the imaging lens system 2, a is a distance between the exit pupil plane of the imaging lens system 2 and the auxiliary optical system 18, and fs is a focal length of the auxiliary optical system 18. If a parallel light flux is made incident upon the imaging lens system 2;

$$y = \frac{a}{F}$$

is obtained. Then, the above equation can be rewritten into as follows.

$$y' = \frac{fs}{\left(1 - \frac{fs}{a}\right) F}$$

Since the focal length fs of the auxiliary optical system 18 is sufficiently smaller than a(fs/a<<1), $$y' \simeq \frac{fs}{F}$$

is obtained. This equation means that the dimension y' of the image of the exit pupil of imaging optical system 2 is inversely proportional to the F number of the imaging optical system 2. Therefore, the last equation can be expressed as follows;

$$y' = C \cdot \frac{1}{F}$$

wherein C is a constant.

In the above mentioned U.S. patent application, the dimension of the first pair of light receiving elements is set to $$y'_{2.8} = C \frac{1}{2.8}$$

and the dimension of the second pair of light receiving elements is set to $$y'_{4.0} = C \frac{1}{4.0}.$$

When use is made of the imaging lens system 2 having the F number of 1.4, 1 the dimension of the image of the exit pupil becomes $$y'_{1.4} = C \frac{1}{1.4}$$

and this image is received by the first pair of light receiving elements. Then a utility efficiency $\eta$ of light can be expressed as follows.

$$\eta = \left(\frac{y'_{2.8}}{y'_{1.4}}\right)^2 = \frac{1}{4}$$

This results in that the sensitivity is decreased by four times. Moreover, when the exit pupil image of the imaging lens system having the F number of 3.5 is received by the second pair of light receiving elements, the utility efficiency $\eta$ becomes as follows;

$$\eta = \left(\frac{y'_{4.0}}{y'_{3.5}}\right)^2 \simeq \frac{3}{4}$$

This means that the sensitivity will be decreased by about 25%.

SUMMARY OF THE INVENTION

The present invention has for its object to provide an apparatus for detecting a focus condition of an imaging optical system in which the focus condition can be detected over a very wide range, while the best focus condition can be determined accurately.

It is another object of the invention to provide a focus detection apparatus having an optical system which is simple and can be adjusted easily and finely.

It is still another object of the invention to provide a focus detection apparatus in which the focus condition can be always detected with a high sensitivity for imaging optical systems having different F numbers.

It is still another object of the invention to provide a focus detection apparatus which can be made small in size and can be easily installed in small optical machineries such as a camera.

It is another object of the invention to provide an apparatus for detecting a focus condition of an imaging optical system, in which a substantial part can be commonly used for two different type focus detections, so that the whole apparatus can be made small in size, light in weight, easy in adjustment and inexpensive in cost.

According to the invention, an apparatus for detecting a focus condition of an imaging optical system comprises means for dividing a light flux transmitted through the imaging optical system into at least two light fluxes;

means comprising at least two light receiving element arrays arranged to receive said at least two divided light fluxes with a given optical path difference therebetween, said at least two light receiving element arrays producing illumination signals from which the focal condition of the imaging optical system is detected on the basis of an image sharpness detection; and means comprising at least one light receiving element array arranged to receive at least one of said divided light fluxes and at least one auxiliary optical system array arranged between said light flux dividing means and said at least one light receiving element array in such a manner that an exit pupil of the imaging optical system and said at least one light receiving element array are conjugated with each other, said at least one light receiving element array producing illumination signals from which the focal condition of the imaging optical system is detected on the basis of an image lateral shift detection.

The present invention also relates to a method for detecting a focus condition of an imaging optical system, in which the focus condition can be detected accurately over a wide range of the imaging optical system.

According to the invention, a method for detecting a focus condition of an imaging optical system comprises the steps of:

dividing a light flux transmitted through said imaging optical system into at least two light fluxes;

receiving at least one of said light fluxes by at least one light receiving element array via at least one auxiliary optical system array to produce a first set of illumination signals, said auxiliary optical system array forming divided images of an exit pupil of the imaging lens system onto each pair of light receiving elements of said light receiving element array;

processing said first set of illumination signals in accordance with a predetermined evaluation function to derive a first signal representing the focus condition of the imaging optical system on a basis of an image lateral shift detection;

receiving said divided at least two light fluxes by at least two light receiving element arrays to produce a second set of illumination signals; and processing said second set of illumination signals in accordance with a predetermined evaluation function to derive a second signal representing the focus condition of the imaging optical system on the basis of an image sharpness detection.

DESCRIPTION OF THE PREFERRED EMBODIMENTS

Figure 9:
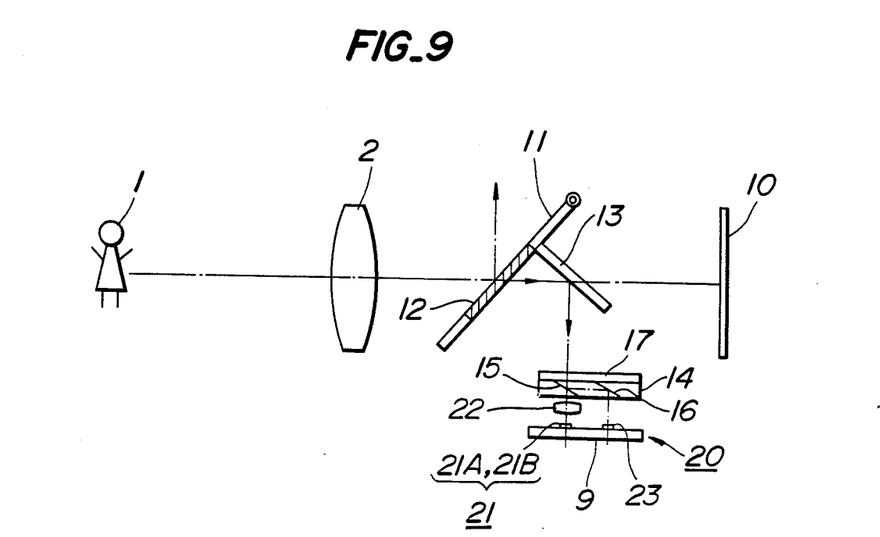
FIGS. 9 and 10 are schematic views showing an embodiment of the focus detection apparatus according to the invention.
Figure 10:
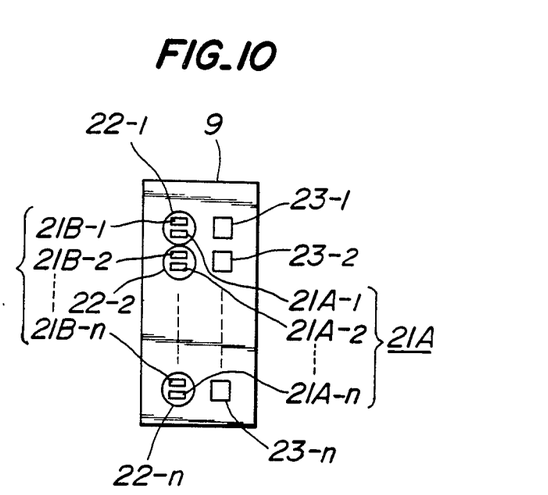

FIGS. 9 and 10 are schematic views showing an embodiment of the focus detection apparatus according to the invention. In the present embodiment, between the light flux dividing prism 14 and one of the light receiving element array 21 of the light detector 20 are arranged auxiliary optical systems 22 such as lenticular lenses. That is to say, the array 21 is commonly used for both the image sharpness detection and image shift detection. The lenticular lenses 22 are positioned in such a manner that the exit pupil of the imaging optical system 2 and the light receiving element array 21 are conjugated with each other for the auxiliary lenses. The light receiving element array 21 comprises first and second light receiving element groups 21A and 21B and for each pair of elements 21A-1, 21B-1; 21A-2, 21B-2; . . . 21A-n, 21B-n are arranged respective auxiliary optical systems 22-1, 22-2 . . . 22-n. That is to say, the lenticular lens array 22 extends perpendicularly to the plane of the drawing of FIG. 9. One of the paired light receiving elements 21A-k receives a light flux transmitted through one half portion of the imaging lens system 2 and the other of the paired light receiving elements 21B-k receives selectively a light flux transmitted through the other half of the imaging lens system 2.

As shown in FIG. 10, the second array of the light receiving elements 23-1, 23-2 . . . 23-n extends in parallel with the first array 21. Due to the prism 14, the first and second arrays are separated from a predetermined focal plane conjugated with the film 10 forwardly and backwardly, respectively by the same distance.

Figure 11:
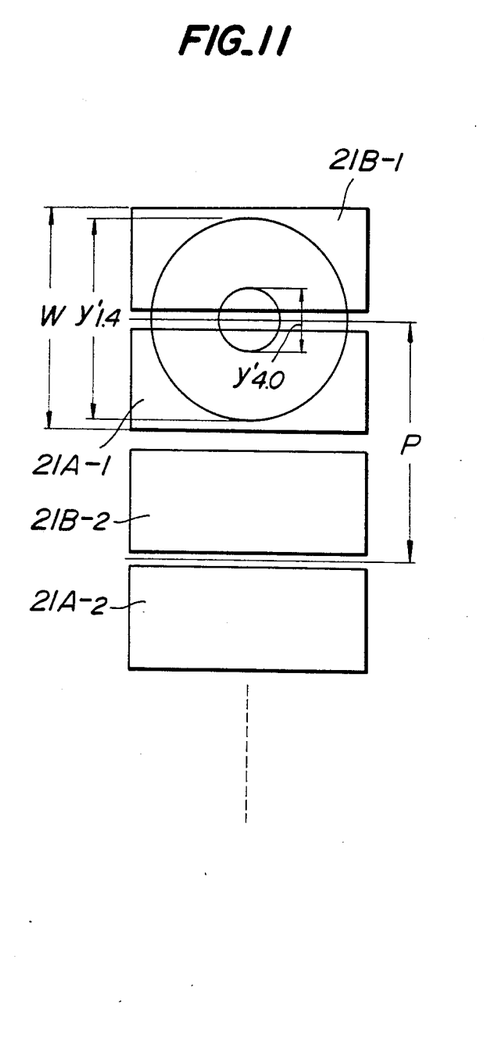
FIGS. 11 and 12 are plan views showing the construction of paired light receiving elements with respect to an auxiliary optical system.

In the present embodiment, each pairs of light receiving elements 21A-1, 21B-1; 21A-2, 21B-2; . . . 21A-n, 21B-n have a dimension larger than the maximum image of the exit pupil of the imaging optical system 2 formed by respective auxiliary optical systems 22-1, 22-2 . . . 22-n. Now it is assumed that the F number of the imaging lens system 2 can vary from 1.4 to 4.0 and the dimension $$y' = \frac{fs}{F}$$

of the image of exit pupil of the imaging lens system formed by respective auxiliary optical lenses 22-1, 22-2 . . . 22-n varies as shown by y'$_{1.4}$ and y'$_{4.0}$ in FIG. 11. Then a length W of each pair of the light receiving elements 21A-1, 21B-1; 21A-2, 21B-2; . . . 21A-n, 21B-n viewed in the direction of the array is determined as follows;

$$P > W > y'_{1.4}$$

wherein, P is a pitch of the auxiliary lenses 22. Therefore, the light receiving elements receive a large amount of light and produce large photoelectrically converted signals. Therefore, the focus condition can be detected with a high sensitivity.

Figure 12:
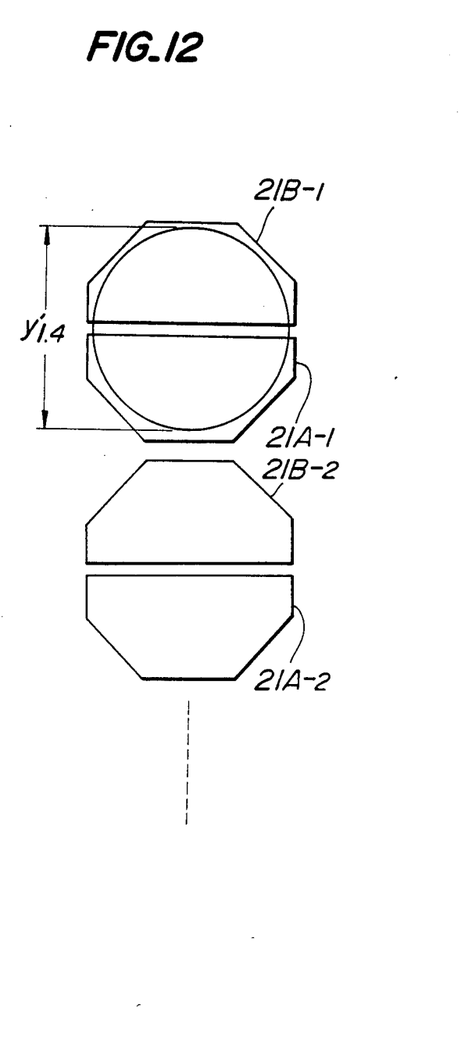

FIG. 12 is a plan view showing another embodiment of the light receiving elements according to the invention. In the embodiment illustrated in FIG. 11, the right receiving element has a rectangular area, but in the present embodiment, the light receiving element has octagonal shape. It should be noted that the light receiving element may be shaped in any desired form such as semicircle or polygons.

According to the invention, a main portion of the optical system, i.e. a portion from the imaging optical system 2 to the dividing prism 14 can be commonly used both for the image sharpness detection and image lateral shift detection. Further, the light receiving element array 21 is utilized commonly for the both detections and the signal processing circuit and central processing unit can be also commonly used for the both detections. Therefore, the focus detection apparatus can be made compact, small and inexpensive and further the adjustment of the various elements can be effected easily and accurately.

According to the present invention, when the imaging optical system 2 is separated far from an in-focused position, the focus condition is detected by the lateral shift detection and after the imaging optical system 2 has been moved into a position near the best focus position (C), the lateral shift detection is switched into the image sharpness detection. Then the imaging optical system can be driven into the best focus position precisely. Since the lateral shift detection is carried out only when the imaging optical system is far away from the in-focus condition, even if the optical alignment of the optical elements is deviated more or less, it is possible to derive the direction of out-of focus. Moreover, since the light receiving elements have the large dimension as compared with the image of the exit pupil of the imaging optical system formed by the auxiliary optical systems, the light sensitivity can be increased materially. Moreover, in the image sharpness detection, each output from the light receiving elements of the array 23 is compared with respective sums of outputs from the paired light receiving elements 21A and 21B and thus, any unbalance between the outputs from the elements 21A and 21B can be effectively cancelled out. Therefore, in the in-focus region, the best focus position can be always detected with the very high sensitivity. Since the auxiliary lenses 22 are inserted in the optical path of the light receiving element array 21, there might be produced unbalance between the sum of outputs of the paired light receiving elements 21A and 21B and the output from the corresponding light receiving element of the array 23. However, this unbalance can be corrected by suitably dimensioning the elements of the array 23 or by suitable electrical treatment.

Figure 13:
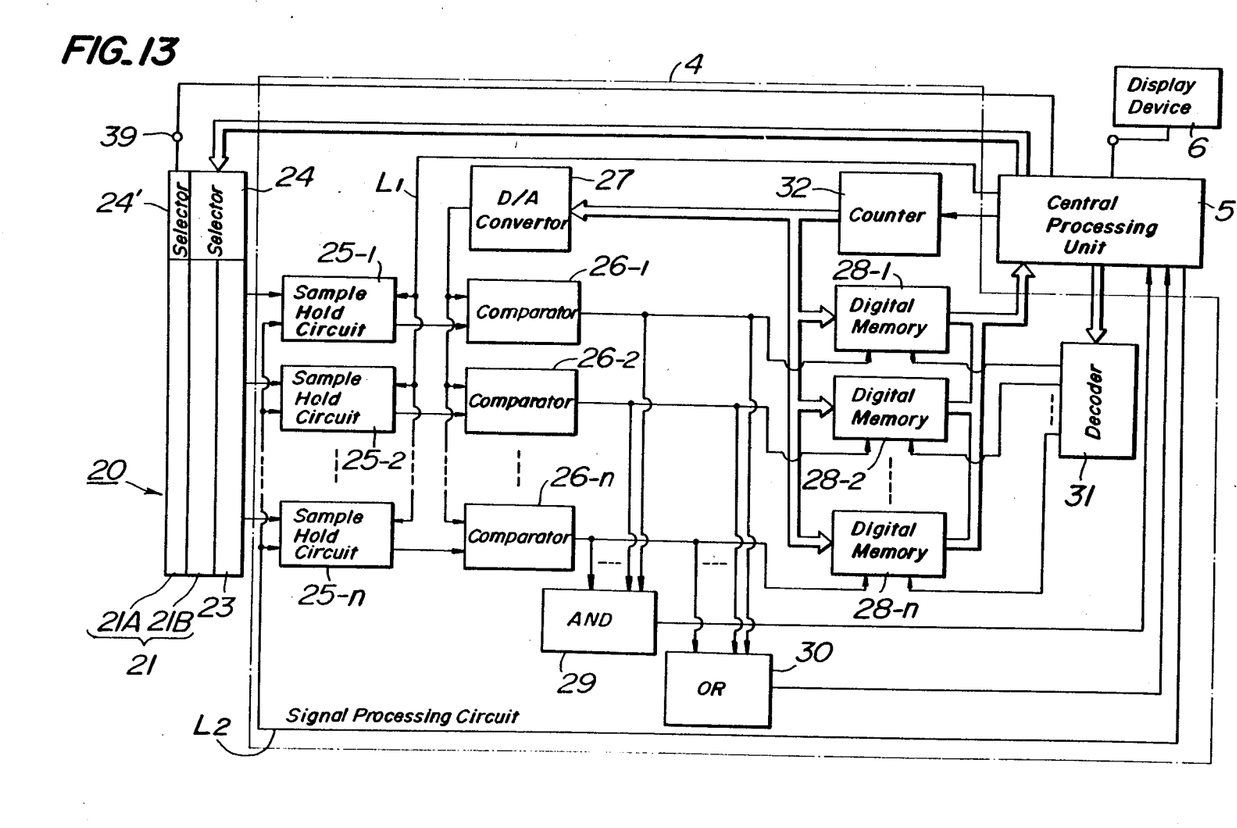
FIG. 13 is a block diagram illustrating an embodiment of the focus detection apparatus according to the invention.

FIG. 13 is a block diagram illustrating an embodiment of the signal processing circuit 4. In FIG. 13, the central processing unit 5, display device 6 and the light detecting device 20 are also shown. The light detecting device 20 comprises the first and second light receiving element arrays 21 and 23 and the first light receiving element array 21 consisting of first and second light receiving element groups 21A and 21B which are arranged alternatively. One of the arrays 21 and 23 is selected by means of a selection circuit 24 which is driven by a command from the central processing unit 5. One of the light receiving element groups 21A and 21B is similarly selected by a selection circuit 24'. Each of the light receiving elements are connected to respective sample and hold circuits 25-1 to 25-n to which a sample and hold signal line and a reset line are parallelly extended from the central processing unit 5. Outputs of the sample and hold circuits 25-1 to 25-n are connected to one inputs of respective comparators 26-1 to 26-n. To the other inputs of the comparators are connected parallelly outputs of a digital-analog converter 27 which converts a digital signal supplied from the central processing unit 5 into an analog reference signal. Outputs of the comparators 26-1 to 26-n are connected to enable inputs of respective digital memories 28-1 to 28-n and to AND circuit 29 and OR circuit 30, outputs of the AND and OR circuits being connected to the central processing unit 5. Inputs of the digital memories 28-1 to 28-n are connected to an output of a counter 32 inserted between the central processing unit 5 and the D/A converter 27 and outputs of the digital memories are connected to the central processing unit 5 via a decoder 31.

Figure 14:
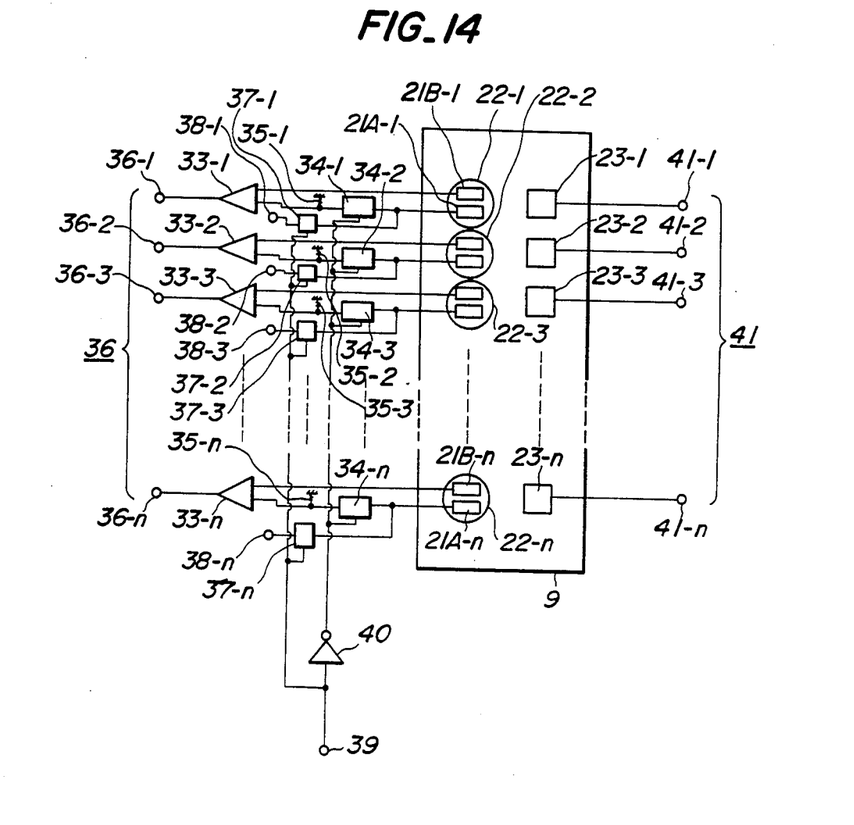
FIGS. 14 and 15 are circuit diagrams depicting an embodiment of a selection circuit shown in FIG. 13.
Figure 15:
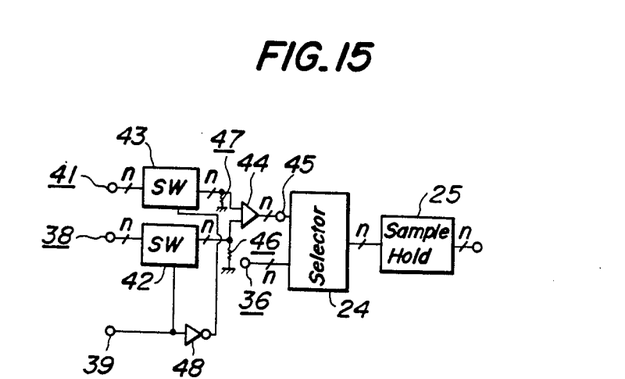

FIGS. 14 and 15 are circuit diagrams showing an embodiment of the selection circuit 24' for selecting the light receiving element group 21A or 21B.

As shown in FIG. 14, the light receiving elements 21B-1, 21B-2 . . . 21B-n are connected to one inputs of respective adders 33-1, 33-2 . . . 33-n, to the other inputs of which are connected the light receiving elements 21A-1, 21A-2 . . . 21A-n via analog switches 34-1, 34-2 . . . 34-n, respectively. The other inputs of the adders 33-1, 33-2 . . . 33-n are connected to the earth potential via respective resistors 35-1, 35-2 . . . 35-n. Outputs of the adders 36-1, 36-2 . . . 36-n are connected to respective n terminals 36 shown in FIG. 15. The light receiving elements 21A-1, 21A-2 . . . 21A-n are also connected via respective analog switches 37-1, 37-2 . . . 37-n and respective terminals 38-1, 38-2 . . . 38-n to respective n terminals 38 in FIG. 15. To a terminal 39 is supplied a control signal from the central processing unit 5 to drive the selection circuit 24'. When the control signal has a logic level of "1", the analog switches 34-1, 34-2 . . . 34-n are opened, but the analog switches 37-1, 37-2 . . . 37-n are closed. To this end, the terminal 39 is connected via an inverter 40 to the analog switches 34-1, 34-2 . . . 34-n and is directly connected to the analog switches 37-1, 37-2 . . . 37-n. The light receiving elements 23-1, 23-2 . . . 23-n are connected to respective n terminals 41-1, 41-2 . . . 41-n which are also denoted by a reference numeral 41.

In FIG. 15, reference numerals 42 and 43 denote the analog switches. The input terminal 38 is connected via the analog switch 42 to one input of an adder 44 and the input terminal 41 is connected via the analog switch 42 to the other input of the adder 44, an output of which is connected to an input of the selection circuit 24. The inputs of the adder 44 are connected to the earth potential via resistors 46 and 47, respectively. The input 39 is directly connected to the analog switch 42 and at the same is connected to the analog switch 43 via the inverter 48. Therefore, when the control signal of the logic level "1" is applied to the control input terminal 39, the analog switch 42 is closed, but the analog switch 43 is opened.

The operation of the circuit shown in FIGS. 14 and 15 will be explained. In case of effecting the lateral shift detection, the central processing unit 5 supplies the control signal of logic level "1" to the terminal 39. Then the analog switches 34-1 to 34-n and 43 are made opened, but the analog switches 37-1 to 37-n and 42 are made closed. Therefore, at the inputs 36, i.e. 36-1 to 36-n of the adders 33-1 to 33-n there are appeared the output signals from the light receiving elements 21B-1 to 21B-n and to the inputs 38-1 to 38-n are applied the output signals from the light receiving elements 21A-1 to 21A-n. Then at the inputs 45 of the selection circuit 24 are appeared the output signals from the elements 21A-1 to 21A-n and at the inputs 36 are appeared the output signals of the elements 21B-1 to 21B-n. One of these signals is selected by the selection circuit 24 and is supplied to the succeeding circuits.

In case of performing the image sharpness detection, the central processing unit 5 supplies the control signal of logic level "0" to the input terminal 39, so that the analog switches 34-1 to 34-n and 43 are closed, but the analog switches 37-1 to 37-n and 42 are opened. Then, at the outputs 36-1 to 36-n of the adders 33-1 to 33-n are appeared sums of the output signals of the paired light receiving elements 21A-1, 21B-1 to 21A-n, 21B-n, respectively and no output signal is produced at the terminals 38-1 to 38-n. Therefore, at the inputs 45 of the selection circuit 24 are appeared the output signals from the light receiving elements 23-1 to 23-n, respectively, and at the inputs 36 there are applied the sums of the output signals from the paired light receiving elements 21A-1, 21B-1; 21A-2, 21B-2; . . . 21A-n, 21B-n, respectively. These input signals are selected by the selection circuit 24 and are further processed by the signal processing circuit 4.

Now the operation of the focus detection apparatus shown in FIG. 13 will be explained. It should be noted each light receiving elements of the arrays 21 and 23 constitute respective picture cells and are also termed as picture cells herein below. At first, the picture cell array 21 is selected by the selection circuit 24 and the central processing unit 5 supplies a start signal to the sample and hold circuits 25-1 to 25-n via a line $L_1$. Then n illumination signals are parallelly supplied from the picture cell array 21 to the comparators 26-1 to 26-n by means of the sample-hold circuit 25-1 to 25-n which are of integration type. The output from the sample and hold circuit is an analog voltage signal having an amplitude which increases in accordance with elapse of time. To the comparators are applied a reference voltage signal having a substantially high constant level from the counter 32 via the D/A converter 27. When one of the analog voltage signals supplied from the sample and hold circuits 25-1 to 25-n reaches the reference voltage signal, this is detected by the OR circuit 30 which sends a signal to the central processing unit 5. In response to this signal, the central processing circuit 5 sends a command to the sample and hold circuits 25-1 to 25-n via a line $L_2$. Then the sample and hold circuits hold the output voltages from the picture cells at that instance. Next, the sampled and held voltages will be converted into digital values in the following manner. The central processing unit 5 supplies clock pulses to the counter 32 which produces a digital signal having a value increasing with an increment equal to a voltage which is obtained by dividing a voltage span between the maximum and minimum analog voltage values by a given number. The increasing digital signal is supplied from the counter 32 to the D/A converter 27 as well as to the digital memories 28-1 to 28-n. The converted analog voltage signal from the D/A converter 27 is applied parallelly to the comparators 26-1 to 26-n. In the comparators, the sampled and held analog voltages are compared with the converted analog voltage to produce change-over signals when these voltages become identical with each other. The change-over signals thus generated are supplied to the digital memories 28-1 to 28-n which store the digital signal which is generated at this instance from the counter 32. When the AND circuit 29 detects the completion of the analog to digital conversion in all channels, it sends a signal to the central processing unit 5 which now stops the counting operation of the counter 32. After that the central processing unit 5 reads the digital illumination signals stored in the digital memories 28-1 to 28-n via the decoder 31 and performs the evaluation of the focus condition on the basis of the read out illumination signals.

Figure 16:
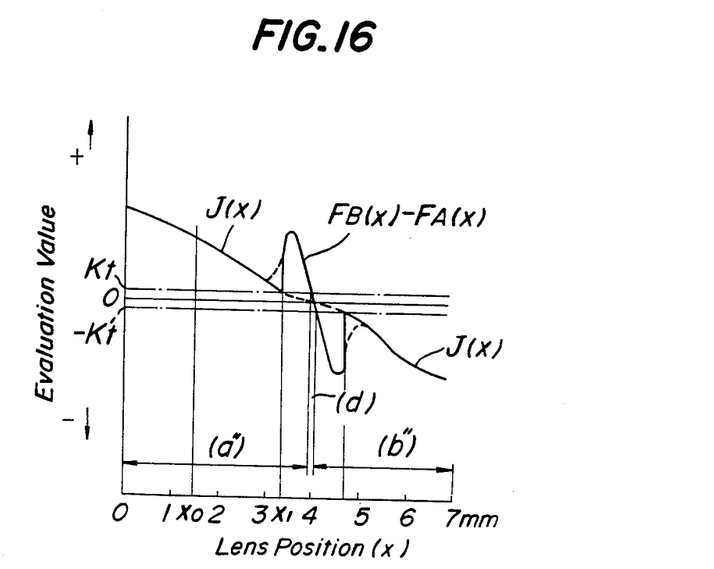
FIG. 16 is a graph for explaining the operation of the focus detection apparatus according to the invention.

Now the evaluation method for detecting the focus condition will be explained with reference to FIG. 16. According to the invention, the image lateral shift detection is predominant to the image sharpness detection. FIG. 16 shows an evaluation value curve with respect to the position of the imaging optical system. The evaluation value curve can be obtained by combining the evaluation value curve $F_B(x)-F_A(x)$ for the image sharpness detection shown in FIG. 4 and the evaluation value curve $J(x)$ for the lateral shift detection illustrated in FIG. 8. As shown in FIG. 16, according to the invention, it is possible to obtain de-focus regions (a") and (b") having a very wide range and an in-focus region (d) having a very narrow range. Therefore, when the evaluation value $J(x)$ of the lateral shift detection becomes within a range defined by $\pm K_l$, the lateral shift detection is changed by the image sharpness detection. When the evaluation value $F_B(x)-F_A(x)$ is decreased within a given range, it is judged that the in-focus condition has been attained.

In FIG. 16, it is now assumed that the imaging lens system is at a position $x_o$ within the de-focus region (a"). Then, the central processing unit 5 supplies the control signal of logic level "1" to the control input terminal 39 shown in FIG. 15 and the evaluation value $J(x)$ is calculated by the central processing unit 5. As the result of it, the backward de-focus condition is displayed on the display device 6. During the movement of the imaging optical system toward the best focus position, the evaluation value $J(x)$ becomes equal to the threshold value $K_t$. Then, the central processing unit 5 sends the control signal of logic level "0" to the control input terminal 39 to initiate the image sharpness detection. While the result of the image sharpness detection is displayed on the display device 6, the imaging optical system can be moved into the in-focus region (d).

Figure 17:
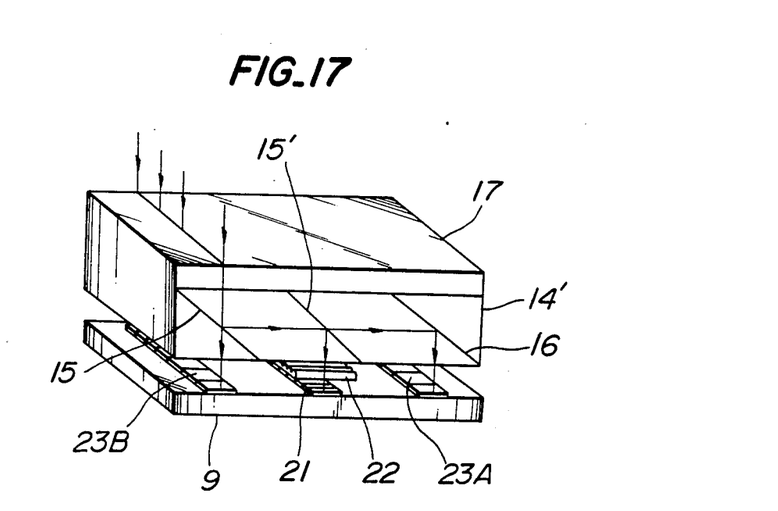
FIGS. 17, 18 and 19 are perspective views showing another embodiments of the focus detection apparatus according to the invention.

FIG. 17 is a perspective view showing another embodiment of the focus detection apparatus according to the invention. In the present embodiment, the image sharpness detection is carried out by means of light receiving element arrays 23A and 23B and the lateral shift detection is performed by a light receiving element array 21. A prism 14' comprises two half mirrors 15 and 15' and a reflection mirror 16 and a light flux reflected by the half mirror 15' is made incident upon the light receiving element array 21 via an auxiliary optical system array 22 such as a lenticular lens array, which is arranged substantially at a plane conjugated with the predetermined focal plane. The light receiving element arrays 23A and 23B are separated from the predetermined focal plane forwardly and backwardly, respectively by a same distance.

Figure 18:
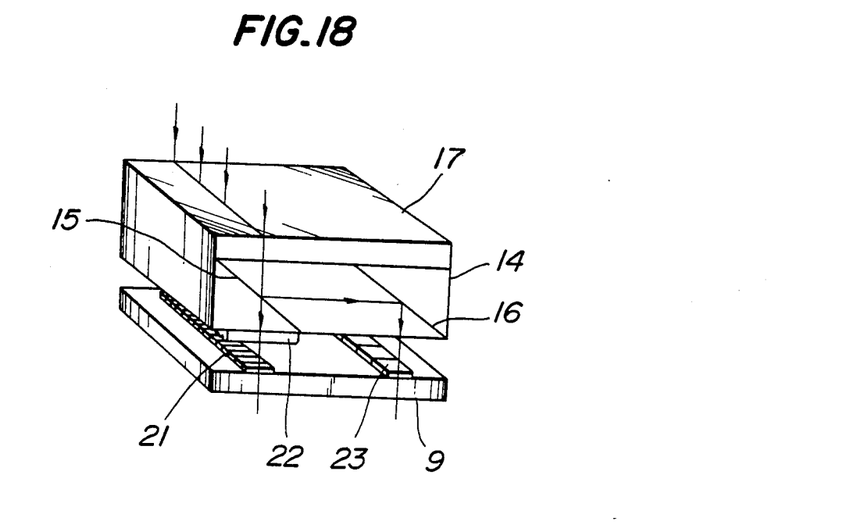

FIG. 18 illustrates another embodiment of the focus detection apparatus according to the invention. In the present embodiment the auxiliary optical system array 22 is provided integrally with the prism 14. The auxiliary lens system array 22 may be integrally formed with the prism 14 or may be cemented to the prism surface. In the former case, the auxiliary lens system array and prism may be formed by molding.

Figure 19:
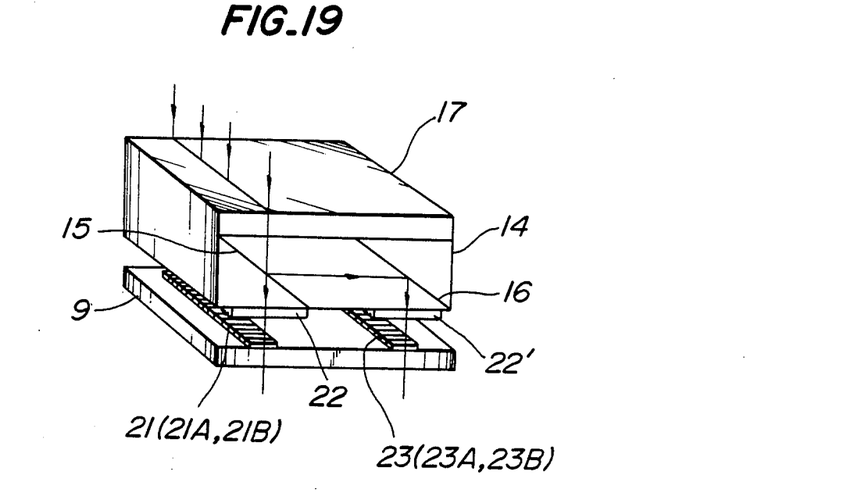

FIG. 19 shows still another embodiment of the focus detection apparatus according to the invention. In this embodiment, the first light receiving element array 21 comprises first and second light receiving element groups 21A and 21B and the second light receiving element array 22 also comprises first and second light receiving element groups 23A and 23B. Further, the light fluxes are made incident upon the first and second light receiving element arrays 21 and 23 via first and second auxiliary lens system arrays 22 and 22', respectively. As shown in FIG. 19, the auxiliary lens system arrays 22 and 22' are provided integrally with the prism 14.

Figure 20:
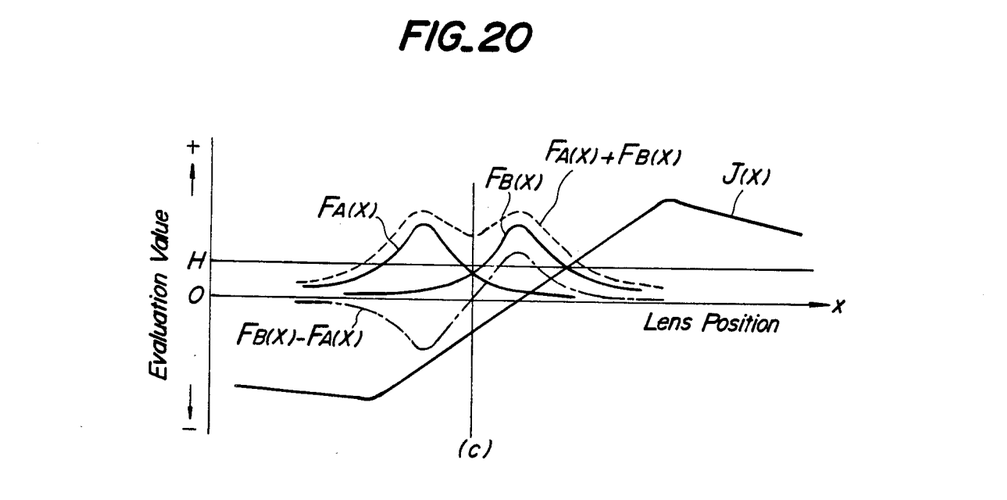
FIG. 20 is a graph for explaining another embodiment of the focus detection method according to the invention.

Now the focus detection method according to the invention will be further explained. In FIG. 20, there are shown the evaluation value $J(x)$ of the lateral shift detection and the evaluation value $F_B(x)-F_A(x)$. In this embodiment, the change between the lateral shift detection and the image sharpness detection is effected by comparing an evaluation value $F_A(x)+F_B(x)$ with a threshold value H. When the evaluation value $F_A(x)+F_B(x)$ is smaller than the threshold value H, the evaluation value $J(x)$ of the lateral image shift is used, but when the evaluation function $F_A(x)+F_B(x)$ exceeds beyond the threshold value H, the evaluation value $F_B(x)-F_A(x)$ of the image sharpness detection is used.

Figure 21:
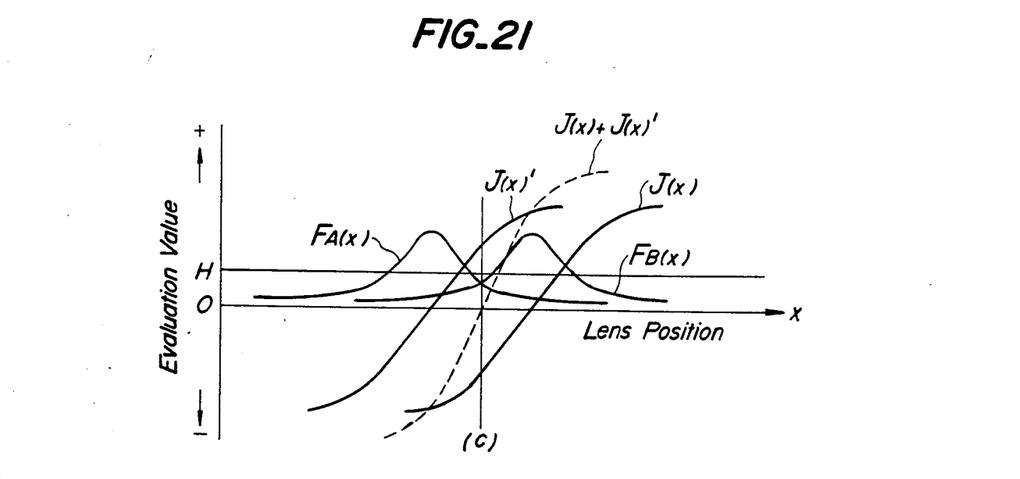
FIG. 21 is a graph for explaining still another embodiment of the focus detection method according to the invention.

FIG. 21 shows still another embodiment of the focus detection method according to the invention, which is suitably applied to the focus detection apparatus shown in FIG. 19. In FIG. 21, evaluation value J(x) and J'(x) are derived by the first and second light receiving element arrays 21 and 23, respectively. Since these arrays are separated from the predetermined focal plane conjugated with the film plane, they do not become zero at the best focus position (c). Now when a sum J(x)+J'(x) of these evaluation values is derived, it becomes zero at the best focus position (c) and symmetrical with respect to zero. Therefore, by using the sum evaluation value J(x)+J'(x) for the lateral shift detection, it is possible to detect the focus condition much stably.

The present invention is not limited to the embodiments mentioned above, but many modifications can be conceived within the scope of the invention. For instance, in the above embodiments, the illumination signals from the light receiving elements are treated parallelly, but they may be processed serially. Moreover, as the method of calculating the evaluation values and also the method of evaluating the focus condition with the aid of the calculated evaluation values use may be made of various known methods. Further, the auxiliary optical systems for dividing the image of the exit pupil of the imaging lens system may be constituted by any optical systems such as dividing prisms and stripe filters.

What is claimed is:

1. An apparatus for detecting a focus condition of an imaging optical system comprising:
    means for dividing a light flux transmitted through the imaging optical system into at least two light fluxes;
    means comprising at least two light receiving element arrays arranged to receive said at least two divided light fluxes with a given optical path difference therebetween, said at least two light receiving element arrays producing illumination signals from which the focal condition of the imaging optical system is detected on the basis of an image sharpness detection;
    means comprising at least one light receiving element array arranged to receive at least one of said divided light fluxes and at least one auxiliary optical system array arranged between said light flux dividing means and said at least one light receiving element array in such a manner that an exit pupil of the imaging optical system and said at least one light receiving element array are conjugated with each other, said at least one light receiving element array producing illumination signals from the focal condition of the imaging optical system is detected on the basis of an image lateral shift detection; and
    means for detecting said focus condition using said means for effecting a lateral shift detection until a near in focus condition is detected, and then for detecting a focus condition using said means for effecting an image sharpness detection.

2. An apparatus according to claim 1, wherein said light flux dividing means comprises a prism including at least one half mirror and one reflecting mirror for reflecting a light flux reflected by the half mirror.

3. An apparatus according to claim 2, wherein said prism comprises one half mirror and one reflection mirror for reflecting a light flux reflected by the half mirror, one of two light receiving element arrays is arranged to receive the light flux reflected by said reflecting mirror and the other light receiving element array is arranged to receive a light flux transmitted through the half mirror via the auxiliary optical system array, the other light receiving element array being used commonly for both the image sharpness detection and the lateral shift detection.

4. An apparatus according to claim 2, wherein said prism comprises first and second half mirrors and one reflecting mirror, said means for effecting the image sharpness detection comprises a first light receiving element array arranged to receive a light flux transmitted said first half mirror and a second light receiving element array arranged to receive a light flux reflected by the first half mirror, transmitted through the second half mirror and reflected by the reflecting mirror and said means for effecting the lateral shift detection comprises a light receiving element array arranged to receive a light flux reflected by said first and second half mirrors and an auxiliary optical system array arranged between the prism and the light receiving element array of said means for effecting the lateral shift detection.

5. An apparatus according to claim 2, wherein said prism comprises a half mirror and a reflecting mirror, said means for effecting the image sharpness detection and said means for effecting the lateral shift detection comprise commonly first and second light receiving element arrays arranged to receive light fluxes transmitted through the half mirror and reflected by the half mirror and reflecting mirror, respectively and said means for effecting the lateral shift detection comprises first and second auxiliary optical system arrays arranged in front of said first and second light receiving element arrays, respectively.

6. An apparatus according to claim 2, wherein said auxiliary optical system array is integrally formed with said prism.

7. An apparatus according to claim 2, wherein said auxiliary optical system array is cemented onto said prism.

8. An apparatus according to claim 1, wherein said auxiliary optical system array comprises a lens array.

9. An apparatus according to claim 8, wherein said lens array is formed by a lenticular lens array.

10. An apparatus according to claim 1, wherein a dimension of paired light receiving elements of the light receiving element array of said means for effecting the lateral shift detection is larger than an image of the exit pupil of the imaging optical system formed by each of auxiliary optical systems.

11. An apparatus according to claim 1, wherein said at least two light receiving element arrays of said means for effecting the image sharpness detection are arranged on respective sides of a plane which is conjugated with a predetermined focal plane of the imaging optical system.

12. A method for detecting a focus condition of an imging optical system comprising the steps of:
    dividing a light flux transmitted through said imaging optical system into at least two light fluxes;
    receiving at least one of said light fluxes by at least one light receiving element array via at least one auxiliary optical system array to produce a first set of illumination signals, said auxiliary optical system array forming divided images of an exit pupil of the imaging optical system onto pairs of light receiving elements of said light receiving element array;
    processing said first set of illumination signals in accordance with a predetermined evaluation function to derive a first signal representing the focus condition of the imaging optical system on a basis of an image lateral shift detection;

after detecting a near in focus condition on the basis of said image lateral shift detection, receiving said at least two divided light fluxes by at least two light receiving element arrays to produce a second set of illumination signals; and processing said second set of illumination signals in accordance with a predetermined evaluation function to derive a second signal representing the focus condition of the imaging optical system on the basis of an image sharpness detection.

13. A method according to claim 12, wherein when said first signal becomes within a predetermined range, said second signal is used as an output focus detection signal.

14. A method according to claim 12, wherein when said second signal is smaller than a predetermined level, said first signal is used as an output focus detection signal.

15. An apparatus according to claim 3, wherein said means for detecting the focal condition on the basis of the image sharpness comprises means for generating sum signals of outputs from paired elements of the other light receiving element array, said sum signals being used together with output signals from the one light receiving element array to detect the focus condition on the basis of the image sharpness detection.

16. An apparatus according to claim 5, wherein said means for effecting the lateral shift detection comprises means for deriving first and second estimation values from outputs of the first and second light receiving element arrays and for deriving a sum of the first and second evaluation values.

* * * * *